Aug. 23, 1938.   J. W. OSTEN   2,127,931
RADIATOR GRILLE SCREEN
Filed June 1, 1937   2 Sheets-Sheet 2
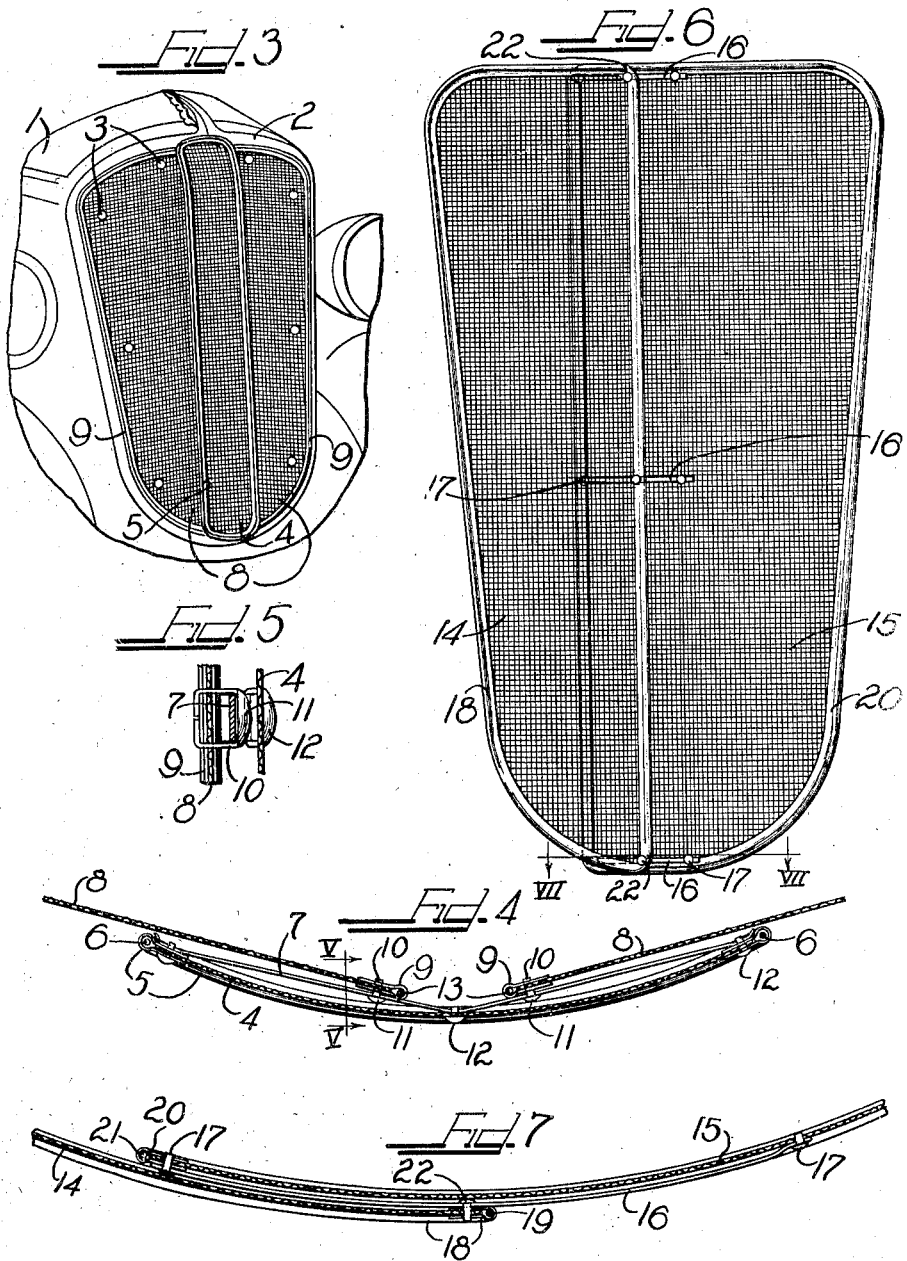
Inventor
JOSEPH W. OSTEN Patented Aug. 23, 1938

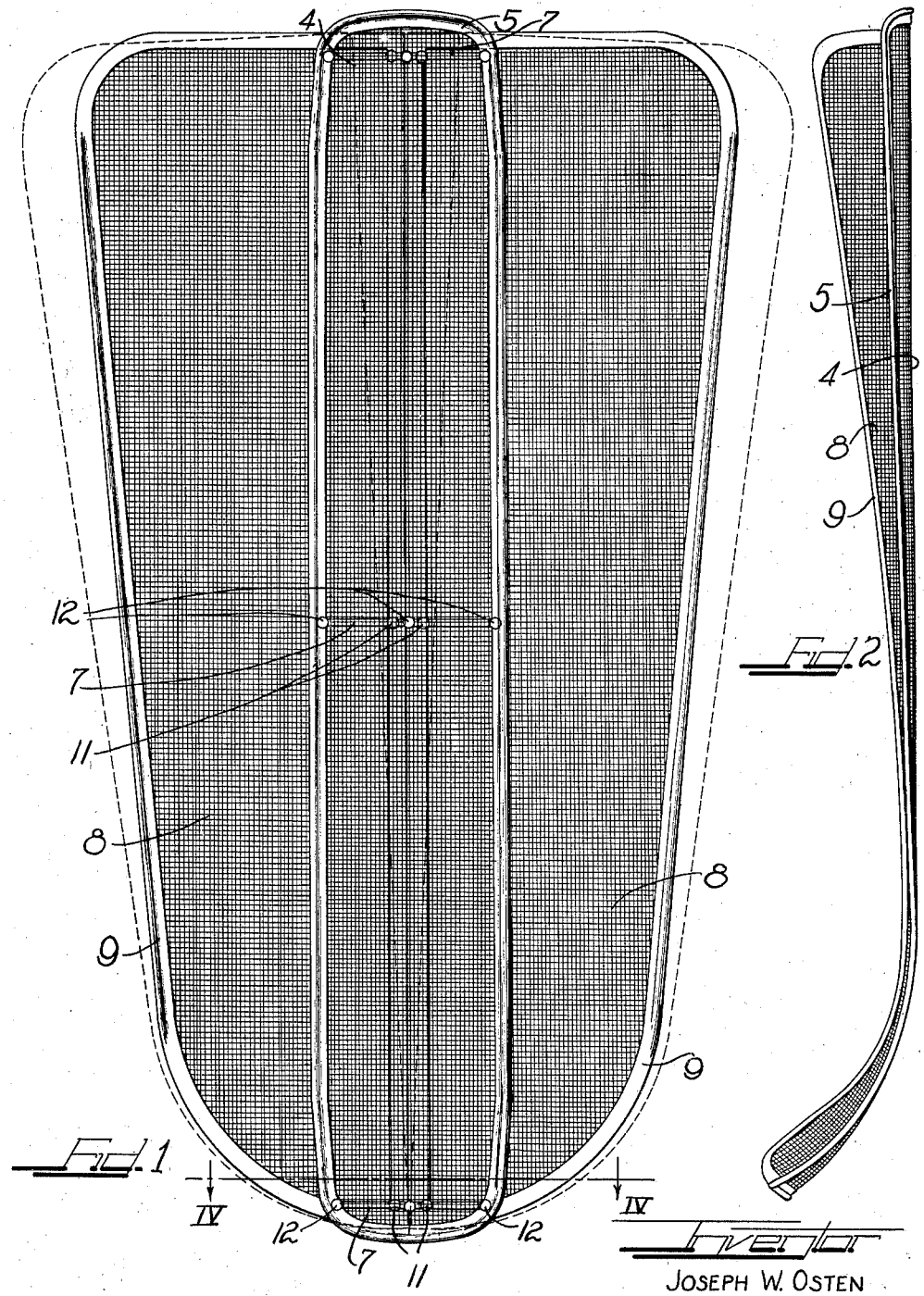

2,127,931

UNITED STATES PATENT OFFICE 2,127,931

RADIATOR GRILLE SCREEN

Joseph W. Osten, Wilmette, Ill.

Application June 1, 1937, Serial No. 145,644

6 Claims. (Cl. 293—54)

The present invention relates to improved types of automobile radiator insect screens for removable engagement over the grilles of automobile radiators for preventing the entrance of insects and the like through the radiator grilles to obviate the clogging up of the openings in the radiator. The invention includes the provision of sectional screens, the sections of which are so connected that they may be transversely adjusted with respect to one another for varying the width and the shape of the screens.

It is an object of this invention to provide a radiator grille insect screen consisting of interconnected screen sections adjustable with respect to one another for varying the width of the screen to adapt the screen for use on different sized radiator grilles.

It is also an object of this invention to provide a radiator grille insect screen comprising a plurality of overlapping interconnected screen sections which are transversely adjustable with respect to one another, whereby the screen may be adapted to fit on automobile radiator grilles of different widths but of substantially the same shapes.

It is a further object of this invention to provide an automobile radiator grille insect screen wherein a plurality of screen sections are adjustably connected to one another by suitable guide means permitting the sections to be slidably adjusted with respect to one another for varying the width and shape of the screen, whereby the screen may be adapted for use on similarly designed radiator grilles of different sizes.

It is an important object of this invention to provide an automobile grille insect screen of two or more adjustably connected screen sections for varying the shape and size of the screen within certain limits for adapting a screen for use on different sizes of radiator grilles, thereby obviating the necessity of the provision of a separate and independent sized screen for every make of automobile radiator grille.

Other and further important objects of this invention will be apparent from the disclosures in the specification and the accompanying drawings.

The invention (in preferred forms) is illustrated in the drawings and hereinafter more fully described.

On the drawings:

Figure 1 is a front elevational view of an improved adjustable radiator grille insect screen embodying the principles of this invention, and illustrating the adjustment thereof in dotted lines.

Figure 2 is a side elevational view of the insect screen illustrated in Figure 1.

Figure 3 is a fragmentary isometric view of the front end of an automobile hood showing the radiator grille covered by means of the improved insect screen releasably held in position connected to the automobile grille by means of releasable fasteners.

Figure 4 is an enlarged fragmentary detailed section taken on line IV—IV of Figure 1.

Figure 5 is an enlarged fragmentary detailed section taken on line V—V of Figure 4.

Figure 6 is a front elevational view of a modified form of a transversely adjustable radiator grille insect screen consisting of two slidably overlapping screen sections transversely adjustable with respect to one another for varying the width of the screen.

Figure 7 is an enlarged fragmentary detailed section taken on line VII—VII of Figure 6.

As shown on the drawings:

The reference numeral 1 indicates an automobile hood enclosing a radiator which is covered by means of a radiator grille 2. As clearly illustrated in Figure 1, the grille bars are covered by means of an improved adjustable type of insect screen which is releasably held in position by means of a plurality of fasteners or holders 3 which engage through the openings in the screen mesh and have the inner ends thereof engaged behind selected grille bars to thereby hold the screen in place leaving only the frame of the grille exposed.

One form of the adjustable insect screen is illustrated in Figures 1 to 5 inclusive and comprises an intermediate or middle screen section consisting of a wire mesh panel 4 banded by a frame 5 of fabric or other suitable material which is stitched to the margins of the intermediate section 4. Enclosed by a hem of the finishing frame 5 is an inner reenforcing wire frame 6. Secured at spaced intervals on the back side of the intermediate wire screen section 4 are a plurality of transversely disposed metal guide straps 7. Both the guide straps 7 and the intermediate panel frame 5 are flexible permitting the same to be bent to conform to the configuration of the shape of the automobile grille on which the screen is to be used.

Disposed behind the intermediate screen section are two side screen sections each comprising a wire mesh side panel 8, the margin of which is enclosed by means of a frame 9 constructed of fabric or other suitable material which is stitched to the wire screen panel 8. Both the longitudinal seams of the side section frame 9 are reenforced by means of flexible wires 13. The inner longitudinal margins of both of the side screen sections 8—8 slidably project behind the longitudinal or side margins of the intermediate screen section 4 and are slidably connected with the intermediate screen section 4 by means of metal guide loops or staples 10 which are clamped through the longitudinal members of the side frame 9. The guide staples 10 are provided with rounded heads 11 which are slidably disposed to contact the rear surface of the wire mesh intermediate screen 4. The side screen sections are adjustable with respect to the intermediate screen section for varying the width and shape of the insect screen. Round headed fasteners 12 are used for holding the guide straps 7 on the rear side of the intermediate wire screen section 4.

As clearly illustrated in Figure 1, the two side panels or screen sections 8 are transversely adjustable with respect to the intermediate screen section 4 and may be pulled outwardly with respect to the intermediate screen section into the dotted line positions illustrated to widen or change the shape of the insect screen for adapting the shape of the screen to the shape of a particular automobile radiator grille on which the screen is mounted. In adjusting the side screen panels with respect to the intermediate screen panel, the guide loops or staples 10 slide over the guide straps 7 thereby permitting the side panels to be pulled outwardly the same distance both at the top and bottom of the side screen sections, or if preferred, the sections may be pivoted with respect to one another, for example the upper ends of the side sections may be pulled out farther than the lower ends similar to the dotted line arrangement illustrated in Figure 1. If desired, the lower ends may be pulled out farther than the upper ends thus permitting the adjustable wire insect screen to be readily adjusted to a plurality of different shapes and sizes to adapt the insect screen for use on various sizes of automobile radiator grilles.

By providing transversely adjustable insect screens of the type hereinbefore described, it is not necessary to provide a separate and distinct wire screen for every type of automobile radiator grille on the market. By providing the adjustable insect screens in a selected number of standard lengths, the wire screens are adapted to be furnished in a small number of standardized shapes adjustable for fitting practically all styles of automobile radiator grilles.

The wire reenforcing members 6 and 13 in the frames of the screen sections serve not only as reenforcing means for the shape of the adjustable screen sections but also serve the purpose of permitting the screen sections to be bent into desired configurations for shaping the adjustable wire screen to conform to the shape and configuration, as well as to the size, of a selected automobile radiator grille.

Figures 6 and 7 illustrate a modified form of adjustable insect screen comprising two wire mesh screen panels 14 and 15. The screen panels 14 and 15 may be provided in the same size, or, as illustrated in Figures 6 and 7, the screen panel 15 may be of a smaller size than the screen panel 15 with which it is associated. The two screen panels 14 and 15 are engaged in overlapping relation with respect to one another and are adjustable transversely with respect to one another for varying the width and size of the insect screen. Mounted at spaced intervals on the screen panel 15 are a plurality of guide straps 16. The guide straps 16 are fastened in position by means of rivets 17 or other suitable means. The margin of the narrow wire panel or screen section 14 is protected by means of a frame of fabric or other suitable material, said frame being designated by the reference numeral 18 and having a reenforcing inner wire frame 19 disposed in a seam of the frame 18. In a similar manner, the margin of the wire screen panel or section 15 is protected by a frame 20 which encloses a reenforcing inner wire frame 21. Secured to the narrow screen panel or section 14 are a plurality of guide staples 22, the looped portions of which are slidably engaged on the guide straps 16 to hold the two screen sections transversely adjustable with respect to one another for varying the width of the screen and the shape thereof to adapt the screen for a plurality of different sized radiator grilles.

While only two transversely adjustable types of insect screens have been illustrated and described, it will, of course, be understood that the screens may be provided in any desired shape for certain groups or makes of radiator grilles. It will, furthermore, be understood that if desired the adjustment for the insect screen may be arranged for permitting vertical adjustment of upper and lower sections with respect to one another to vary the height or length of the screens instead of the width. Or, if desired, the screens may be constructed to permit both vertical and transverse adjustment of the screen sections by connecting the sections similar to the arrangement illustrated in Figures 1 and 6.

It will, of course, be understood that various other details of construction may be varied through a wide range without departing from the principles of this invention, and it is, therefore, not the purpose to limit the patent granted hereon otherwise than necessitated by the scope of the appended claims.

I claim as my invention:

1. The combination with an automobile radiator grille, of an automobile grille screen comprising a plurality of screen sections arranged in overlapping relation with respect to one another, and guide means connecting the overlapping screen sections to permit shifting and pivoting of the screen sections with respect to one another to vary the size and shape of the screen.

2. An automobile insect screen comprising a plurality of screen sections, frames surrounding said sections, reenforcing means in said frames, and movably interfitting guide means connecting the sections in overlapping relationship and permitting the sections to be slidably and pivotally adjusted with respect to one another for varying the size of the insect screen.

3. An automobile insect screen comprising a plurality of screen sections, flexible frame bindings around the margins of said screen sections, flexible inserts in said frame bindings and bendable for shaping the insect screen into a desired form, and guide means connecting the screen sections for adjustable movement relative to one another to vary the size and shape of the insect screen.

4. An automobile grille insect screen comprising a plurality of wire mesh sections, flexible border frames secured to the sections, flexible inserts in the border frames bendable for shaping the insect screen, guide members secured to one of the wire mesh sections, and means on the remaining screen section slidably adjustable on the guide members for holding the screen sections slidably adjustable with one another for moving the screen sections for changing the shape and size of the insect screen to adjust the insect screen to fit various styles and sizes of automobile grilles.

5. An automobile grille insect screen comprising an intermediate wire mesh section, a flexible frame binding the margin thereof, flexible inserts in the flexible frame to permit changing of the shape of the intermediate section, guide members secured to the intermediate section, a plurality of side wire mesh sections overlapping the intermediate section, flexible frames binding the margins of the side sections, flexible inserts in the binding frames of the side sections, and means on the side sections slidably engaged on the guide members of the intermediate section permitting the side sections to be moved and adjusted with respect to the intermediate section for varying both the size and the shape of the insect screen for adaptation of the insect screen to fit various sized radiator grilles.

6. An automobile grille insect screen comprising a wire mesh frame section, a flexible border frame thereon, guide members on the main section, an auxiliary wire mesh section, a flexible border frame thereon, and means on the auxiliary section slidably engaged on the guide members of the main section for movable adjustment of the auxiliary section with respect to the main section for varying the shape and size of the insect screen for use on different shaped and sized radiator grilles by adjusting the sections and bending the flexible border frames to shape the insect screen complementally to the configuration of the radiator grille on which the screen is mounted.

JOSEPH W. OSTEN.